(12) United States Patent
Mohamed et al.

(10) Patent No.: US 8,759,434 B1
(45) Date of Patent: Jun. 24, 2014

(54) NANO-SIZED COMPOSITES CONTAINING POLYVINYL PYRROLIDONE MODIFIED SODIUM SILICATES AND METHOD FOR MAKING BINDERS USING SAME

(71) Applicants: Abu Dhabi University, Abu Dhabi (AE); United Arab Emirates University, Al-Ain (AE)

(72) Inventors: Abdel-Mohsen Onsy Mohamed, Abu Dhabi (AE); Maisa Mabrouk El-Gamal, Al Ain (AE)

(73) Assignees: Abu Dhabi University, Abu Dhabi (AE); United Arab Emirates University, Al-Ain (AE)

( * ) Notice: Subject to any disclaimer, the term of this patent is extended or adjusted under 35 U.S.C. 154(b) by 0 days.

(21) Appl. No.: 13/689,943

(22) Filed: Nov. 30, 2012

(51) Int. Cl.
| | |
|---|---|
| *B60C 1/00* | (2006.01) |
| *C08K 3/34* | (2006.01) |
| *B01J 19/06* | (2006.01) |
| *C08F 26/06* | (2006.01) |
| *C08F 24/00* | (2006.01) |

(52) U.S. Cl.
USPC ........... 524/492; 524/493; 524/516; 526/258; 526/266

(58) Field of Classification Search
USPC .................. 524/492, 493, 516; 526/258, 266
See application file for complete search history.

(56) References Cited

U.S. PATENT DOCUMENTS

| | | | |
|---|---|---|---|
| 1,827,238 A | 10/1931 | Joosten | |
| 2,968,572 A * | 1/1961 | Peeler, Jr. ..................... | 106/633 |
| 4,043,830 A | 8/1977 | Suzuki | |
| 4,056,937 A | 11/1977 | Suzuki | |
| 4,416,694 A | 11/1983 | Stevenson et al. | |
| 4,642,196 A | 2/1987 | Yan | |
| 4,983,218 A | 1/1991 | Mascioli | |
| 5,059,247 A | 10/1991 | Crawford et al. | |
| 5,336,315 A | 8/1994 | Cuscurida et al. | |

* cited by examiner

*Primary Examiner* — William Cheung
(74) *Attorney, Agent, or Firm* — Lowe Hauptman & Ham, LLP (57) ABSTRACT

This invention provides a method to form nano-sized dispersed structure consisting of aqueous sodium silicate and polyvinyl pyrrolidone (PVP) solutions, and a binder consisting of a nano-sized dispersed structure and calcium chloride dihydrate solution. The invention provides also a method to immobilize sand dunes and wind-blown dust by using the binder.

17 Claims, 4 Drawing Sheets

| | | | |
|---|---|---|---|
| A | Sodium Silicate Solution | 1 | Sand Dunes Silo |
| B | Polyvinyl Pyrrolidone Solution | 2 | Drying Kiln |
| C | Calcium Chloride Dihydrate Solution | 3 | Transfer Device |
| D | Sand Dunes | 4 | Transfer Pump |
| E | Final Solidified Product | 5 | Sand Dune Scale Hopper |
| Mix A | Nano-Sized Dispersed Colloidal Mixture | 6 | Mulling Device |
| Mix B | Polyvinyl Pyrrolidone Modified Calcium Silicate Solution | 7 | Heating Medium Heater |

An explanatory view of a polyvinyl pyrrolidone modified calcium silicate production system

FIG. 1

Scanning micrographs of solidified sand dunes with sodium silicates and calcium chloride without addition of PVP

FIG. 2

Scanning micrographs of solidified sand dunes with PVP modified sodium silicates and calcium chloride

FIG. 3

FTIR of solidified sand dunes with (a) sodium silicates and calcium chloride without addition of PVP, and (b) with modified sodium silicates and calcium chloride

FIG. 4

NANO-SIZED COMPOSITES CONTAINING POLYVINYL PYRROLIDONE MODIFIED SODIUM SILICATES AND METHOD FOR MAKING BINDERS USING SAME

FIELD OF THE INVENTION

This invention relates to nano-sized composites and methods for making and using binders using the nano-sized composites and more particularly to nano-sized composites containing polyvinyl pyrrolidone modified sodium silicate and methods for making and using the same. The invention also relates to a binder comprising a nano-sized dispersion structure and a calcium chloride dihydrate solution for immobilizing sand dunes and wind-blown dust by using a binder.

BACKGROUND FOR THE INVENTION

Sand dune movements and dust storms are common in Arabian Gulf countries. It occurs because of the existence of fine particles on the surface of the top soils, which are poorly bonded and susceptible to erosion by wind and rain. This invention pertains to binder compositions useful for binding particulate matter and sand dunes.

Soluble silicates have been used as binders for many years and in many applications. It is a white powder or colorless solution that is readily soluble in water, producing an alkaline solution. As this alkaline solution is neutralized, colloidal silica aggregates to form a gel. To control aggregation, gelation time, and gel performance, grouting systems were developed over the last 100 years. These systems include: (a) acid reactant (phosphoric acid, sodium hydrogen sulfate, sodium phosphate, carbon dioxide solution), (b) alkaline earth and aluminum salts (calcium chloride, magnesium sulfate, magnesium chloride, aluminum sulfate), (c) organic compounds (glyoxal, acetic ester, ethylene carbonate formamide).

U.S. Pat. No. 1,827,238 to Joosten describes a process for solidifying permeable rock, loosely spread masses, etc. in which silicic acid is introduced into the mass followed by the introduction of carbon dioxide thus integrating and solidifying the treated mass.

U.S. Pat. No. 2,968,572 to Peeler, Jr. teaches a process of soil treatment in which the soil is contacted with a single liquid mixture comprising an aqueous alkali metal silicate, and amide, such as formamide and a metal salt such as sodium aluminate thereby forming a water-insoluble gel.

U.S. Pat. No. 4,043,830 to Suzuki discloses a process for consolidation of poor quality soil by injecting hardeners comprising, for example, a mixture of water and a gelling agent and a water glass aqueous solution containing a gelling agent such as ethylene glycol diacetate.

U.S. Pat. No. 4,056,937 to Suzuki teaches a soil consolidation process in which a hardener comprising an aqueous solution of water glass and an acidic reactant, such as phosphoric acid, is injected into the soil thereby solidifying the treated soil.

U.S. Pat. No. 4,416,694 to Stevenson et al. discloses foundry sand compositions made from foundry sand, an aqueous sodium silicate binder and an alkylene carbonate which are used to form molds and/or cores in metal casting.

U.S. Pat. No. 4,642,196 to Yah teaches a method and composition for controlling dust occurring in the production, handling, transport and storing of coal which includes applying such as by spraying an aqueous solution of a gelatinized starch.

U.S. Pat. No. 4,983,218 to Mascioli discloses a composition and method for hardening an alkali metal silicate solution using blends of alkylenediols, polyoxyalkylene glycols or hydroxyalkyl ethers. The hardened alkali metal silicate compositions are useful as binders in the preparation of foundry molds or in other applications requiring agglomeration of particulate matter.

U.S. Pat. No. 5,059,247 to Crawford et al. teaches a foundry sand composition that is self-hardening after a working life of about 10-20 minutes composed of foundry sand, a sodium silicate binder and a specifically defined polyester polycarbonate hardener.

U.S. Pat. No. 5,336,315 to Cuscurida et al. describes a process for soil stabilization in which soil particles are treated with an aqueous solution of an alkali metal silicate, and a carbonate reactant or gelling agent selected from the group consisting of an alkylene carbonate, such as ethylene carbonate, a polyester polycarbonate and mixtures thereof.

However, problems such as homogeneity, volume changes, loss of strength, and in-situ application still exist. Therefore, it is the purpose of this invention to provide a method to form a nano-sized dispersed structure comprising or consisting of aqueous sodium silicate solution and polyvinyl pyrrolidone (PVP) which controls aggregation and homogeneity, and a binder consisting of a nano-dispersed structure and calcium chloride dihydrate solution which controls system aggregation, homogeneity, gelling time, gel performance, and strength development. The invention also provides a method to immobilize sand dunes and wind-blown dust by using the binder.

Nano-sized composites consisting of aqueous sodium silicate solution and PVP, and reactant consisting of calcium chloride dihydrate solution can be injected as separate solutions, or can be premixed to form a single solution that is then injected. Treatment of soft soils by deep mixing with binders is the most frequently used method of ground improvement and is increasingly being used internationally over the last decades. Success of any treatment method is directly related to overall strength development which is a direct function of binder composition, method of application, substrate formation and composition in terms of particle-size distribution, grain size, particle shape and moisture content, the ability of the grout to adhere to particle surfaces, and curing environment.

SUMMARY OF THE INVENTION

In essence, the present invention contemplates a nano-sized composite (1-100 nm) for use as a binder to immobilize sand dunes and wind-blown particles. The composite comprises and/or consists of a polyvinyl pyrrolidone (PVP) modified sodium silicate and a calcium chloride dihydrate solution. In a preferred embodiment of the invention, the composition includes about 13 to about 66 volume percent of an aqueous sodium silicate solution, from about 1 to about 5 wgt. % of PVP solution and from about 0.5 to 1.5 wgt. % of calcium chloride dihydrate solution.

A second embodiment of the invention contemplates a method for immobilizing sand dunes and wind blowable particles by applying a composite according to the first embodiment of the invention therein as for example by injection and/or thereon as for example by spraying.

The invention will now be described in connection with the following figures.

DESCRIPTION OF THE PREFERRED EMBODIMENTS OF THE INVENTION

Figure 1:
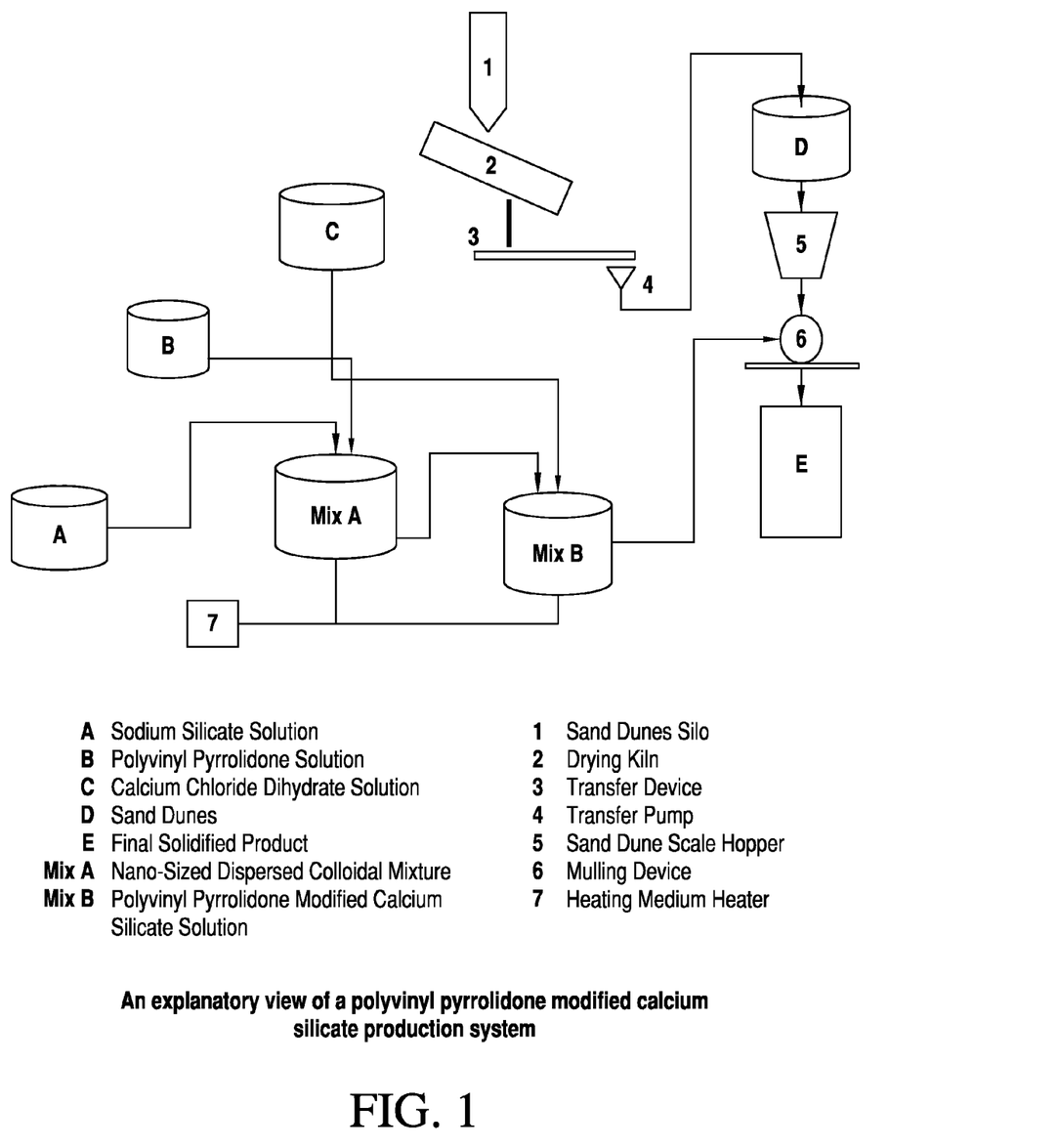
FIG. 1 is a schematic view of a polyvinyl pyrrolidone modified calcium silicate production system.

This invention provides a binder to immobilize sand dunes and wind-blown dust, or any other surface where safety of motor vehicles and durability of an access road is of concern. In this invention a nano-sized dispersed structure, referred to as mixture A, comprising or consisting of an aqueous sodium silicate solution, designated as compound A, and a polyvinyl pyrrolidone (PVP), designated as compound B, is formed to control aggregation and homogeneity. Also, a binder, referred to as mixture B, consisting of a nano-dispersed structure (mixture A) and calcium chloride dihydrate solution, designated as compound C, is formed to control system aggregation, homogeneity, gelling time, gel performance, and strength development. FIG. 1 shows an explanatory view of a polyvinyl pyrrolidone modified calcium silicate production system for the intended purpose of this invention.

The binder employed in this invention can be injected for in-situ application as separate solutions (mixture A and then compound C), or can be premixed to form a single solution (mixture B) that is injected, as shown in FIG. 1. Sand dunes are then harden and prevent dust from flying. It also prevents sand dunes and dust piles from movement due to water seepage. In some cases the binder may be sprayed onto or partially sprayed onto the surface to be fixed.

Compound A shall consist essentially from about 13 to 66 volume percent of an aqueous sodium silicate solution and from 1 to 5 weight percent of PVP solution. Compound B shall consist essentially from about 0.5 to 1.5 weight percent of calcium chloride dihydrate solution.

Control of gelation time is important with respect to the applicability of the invention. It is a function of the binder composition, ratios of mixed components, and environmental conditions. When sand dunes and gel are in contact, mechanical properties of solidified materials increase suggesting a possible reaction between both components. The main reaction involved during the material solidification is electrostatic interactions between negative charges on the PVP chain and positively charged silica species.

The rate of gelation and the consistency of the resulting binder are controlled by varying reactant concentration, sequence of mixing and mixing temperature. Practically, PVP is reacting with a sodium silicate solution to form a nano-sized dispersed colloidal system which polymerizes further with calcium chloride to form a gel which binds sand dune particles together and fills the voids.

Variation of the reactant ratios has an influence on the characteristics of the desired gel. The characteristics recognized as being the most important ones are pH, density, viscosity and gelling time. The optimum gelling time suggested in this invention is between 15 and 60 minutes.

Increase of temperature may facilitate the mixing and gelation reaction by decreasing the viscosity coefficient, increasing the diffusion coefficient and enhancing the reaction between system components. When gelling mixture is mixed with the sand dunes, a hard gel is formed. The two possible reactions contributed to gel formation are polymerization and/or precipitation.

In this invention, the PVP has been utilized to modify sodium silicate and form a nano-sized (1 to 100 nm) dispersed structure because of its following advantages as a biocompatible polymer material:

1. PVP lowers the pH of sodium silicate; where, silica particles carry negative charges at high pH values. As a result, there are strong electrostatic repulsion forces between silica particles. These forces are high enough such that silicate solutions do not gel at pH greater than 11. To induce gelation, these electrostatic forces were reduced by addition of PVP.
2. PVP exhibits the ability to interact with a variety of surfaces by hydrogen or electrostatic bonding and resulting in protective coatings and adhesive properties.
3. PVP interacts with positively charged silicate species electrostatically through negative charges on its chain.
4. PVP reacts with silicates in solution to form a nano-sized dispersed structure, which polymerizes further in the presence of calcium chloride to form the gel that binds sand dunes particles together. The gel forms an adhesive bond with the surrounding sand particles.
5. PVP reduces the gelation time of sodium silicates and contributes to strength development with sand dunes via electrostatic bonding.
6. PVP prevents silica precipitation and volume change of treated soil matrix because without addition of PVP to a mixture of sodium silicate and $CaCl_2$, an immediate precipitation occurred and gel was not formed causing soil shrinkage.
7. PVP forms an intermediate nano-sized dispersed structure which increases the adhesion property of the formed gel on addition of $CaCl_2$ to the mixture of sand dunes. The inter diffusion of PVP had been a key factor in improving the adhesion property of the silicate.
8. PVP acts as a smoother for both silicates and sand dune particles.
9. PVP facilitates hydrogen bonding between the amide carbonyl groups of PVP and surface hydroxyl groups of silicate leading to a dense hybrid structure.
10. PVP contains bulky side groups composed of a five membered ring amide which contribute to friction development and reduction of volume of voids within the solidified matrix leading to overall restriction and immobility of sand particles.
11. Chemical binding of PVP exfoliates silicates and forms linked silicate particle chains that, when incorporated in binders, improve the post-failure properties of the solidified sand dunes.
12. PVP silicate gel system provides an economical and environmental binding material because of its biological compatibility, low toxicity, effectively produced without fumes, odor-free, fast and easy to apply film-forming and adhesive characteristics, unusual complexing ability, relatively inert behavior toward salts and acids, and its resistance to thermal degradation in solution.

Fourier transform infrared spectroscopy (FTIR) which is a technique used to obtain an infrared spectrum of absorption, emission, photoconductivity or RAMAN scattering of a solid, liquid or gas.

One of the key goals of binding substances is a purposeful correction of the formation of nano-phases achieved through modification of the substance at nano-level. Nano particles induce additional atomic bonding and increase viscosity of the liquid phase, which helps to bind gelling materials and aggregate grains and improves resistance to segregation as well as increases the workability of treated materials. To obtain better properties of solidified materials at the macro-level, the formation of phases has to be purposefully corrected and the properties of these materials have to be investigated at micro-level because nano-additives in binders act as additional catalysts that change the direction and rate of physical and chemical processes. PVP modified sodium silicates solution contains nano colloidal particles.

When PVP is added to sodium silicate in the initial stage, a nano-sized dispersed system is formed. Therefore formation of large crystal hydrates in the initial stage of structure formation is hindered and thus formation of amorphous hydration structures of nano-particle size that accumulate higher energy shall be promoted in addition. A binding system consisting of colloidal sodium silicate solution and PVP suspension may be used for this purpose.

As described earlier, in this invention, a silicate polymer gel is formulated by adding sodium silicate solution to a mixture of polyvinyl pyrrolidone (PVP) as acidic reactant agent and calcium chloride dihydrate as gel time control agent. This mixture is capable of cross-linking the silicate and form a gel network, which is penetrable into a coherent and hard mass, and can be efficiently used for sand dunes solidification.

Practically, PVP reacts with sodium silicate solution to form a nano-sized dispersed colloidal solution which polymerizes further in the presence of calcium chloride dihydrate to form a gel which binds sand dune particles together and fills voids. The rate of gelation reaction and the consistency of the resulting gel are controlled by varying reactant concentration, sequence of mixing and mixing temperature.

Example 1

Alteration of the Composition of Sodium Silicate

The three basic techniques to change the composition of sodium silicate compound to meet final product specifications are the alkali change, dilution and the introduction of additional ingredients. The sodium silicate solution is a viscous Newtonian fluid. Neutral sodium silicate solution QP from Sigma-Aldrich was used; it has the following specification: weight ratio of silica ($SiO_2$) to sodium oxide ($Na_2O$) of 3.22:1, 37.6% wt. active and 62.4% $H_2O$, viscosity of 180 cp, density of 1.37 g/cm$^3$ at 23° C. and pH of 12. Sodium silicate solution was diluted with distilled water to prepare all gelling solutions.

Dilution reduces the product's viscosity and increases its penetration into soil strata. The dilution rate should be adjusted on the basis of soil hydraulic conductivity and the desired strength of the solidified mass. For soils with hydraulic conductivity of $10^4$ cm/sec, binder viscosity should be less than 2 cP. However, binders having higher viscosities of 5 cP and 10 cP are applicable for soils with hydraulic conductivities greater than $10^{-3}$ cm/sec and $10^{-2}$ cm/sec, respectively.

Table 1 shows the effect of dilutions on the viscosity, density and pH of sodium silicate solutions. This variation is an advantage because soil structure tends to vary from place to place and so silicate solutions of different concentrations, viscosities and speeds of gelling are required. The binding strength of sand with sodium silicates increases with increasing viscosity, but the infiltration rate decreases with increasing viscosity. As a result, highly viscous sodium silicates solution is left at the sand surface to form a thin layer of binding crust. On the other hand, a too low viscosity leads to a higher infiltration rate, which may prevent the formation of a crust with sufficiently high binding strength. Hence, proper emulsion dilution of the hardener is very important to successfully glue the sand particles.

TABLE 1

Effect of dilution on viscosity, density and pH of sodium silicate solutions

| Sodium Silicate (Vol. %) | Water (Vol. %) | pH | Viscosity (cP) | Density (g/cm$^3$) |
|---|---|---|---|---|
| 100 | 0 | 12.03 | 179.00 | 1.3748 |
| 80 | 20 | 11.98 | 49.92 | 1.3279 |
| 70 | 30 | 11.96 | 9.48 | 1.2653 |
| 60 | 40 | 11.93 | 4.78 | 1.2211 |
| 50 | 50 | 11.90 | 3.39 | 1.1698 |
| 40 | 60 | 11.87 | 2.38 | 1.1457 |
| 30 | 70 | 11.84 | 1.96 | 1.1253 |
| 10 | 90 | 11.79 | 1.33 | 1.0899 |

When sodium silicate is dissolved in water, different silicate species tend to dominate at varying pH as described below (Iler 1979, see reference near end of specification).

$$SiO_2 + 2H_2O \rightarrow Si(OH)_4 \quad (1)$$

$$Si(OH)_4 + OH^- \rightarrow HSiO_3^- + 2H_2O \quad (2)$$

$$2HSiO_3^- \rightarrow Si_1O_5^{2-} + H_2O \quad (3)$$

$$Si_2O_k^{2-} + H_2O \rightarrow HSi_2O_6^{3-} + H^+ \quad (4)$$

$$HSiO_3^- + OH^- \rightarrow SiO_3^{2-} + H_2O \quad (5)$$

At pH lower than 11, silica polymerizes and forms stable nano-colloidal particles with diameter about 1 nm. The polymer growth from monomer to tetramer can be expressed as monomer ($H_4SiO_{4(aq)}$) addition as shown (Icopini et al. 2005, see references near end of specification):

$$H_4SiO_4(aq) + H_4SiO_4(aq) \rightarrow H_6Si_2O_7(aq) + H_2O \quad (6)$$

$$H_6Si_2O_7(aq) + H_4SiO_4(aq) \rightarrow H_8Si_3O_{10}(aq) + H_2O \quad (7)$$

$$H_8Si_3O_{10}(aq) + H_4SiO_4(aq) \rightarrow H_8Si_4O_{12}(aq) + 2H_2O \quad (8)$$

As indicated by the additional water generated in Eq. 8, the final product is assumed to condense as a cyclic tetramer. In the initial stages of reaction, silica monomers combine to form small oligomers, which in turn react with monomers, as described by Eqs. 7 and 8, to form larger oligomers (Perry et al., 2000). These silica oligomers maximize the number of siloxane bonds (Si—O—Si) and minimize the uncondensed Si—OH groups (Iler, 1979). This condensation is thought to lead to the formation of ring structures with 3 to 6 silicon atoms linked by siloxane bonds early in the process (Perry et. al., 2000).

As per Eq. 8, the critical nucleus generated behaves chemically in a fashion that is similar to bulk amorphous silica. Unlike classical colloidal systems, silica colloids are stable near their zero point of charge (Allen and Matijevic, 1969). This lack of reactivity is attributed to the fact that $H^+$ can out-compete all other dissolved species (including silica) for silica surface sites at low pH. As pH increases towards 7, the decrease in the activity of $H^+$ and the increase in un-protonated Si—O— groups on the colloidal surfaces naturally lead to an increased sensitivity of polymerization to ionic strength and silica concentration.

At higher than neutral pH there is a decreasing sensitivity of polymerization rate to silica concentration (Icopini et al. 2005). This phenomenon could be related to the increasing electrostatic repulsion between negatively charged particles at high pH due to the de-protonation of silica species.

The solutions at near-neutral pH exhibited the most rapid rates of $[SiO_2]_{n \leq 3}$ loss, and the behavior of the silica reactive fraction in these rapid reactions is complicated by their subsequent involvement in reactions that ultimately led to the growth of silica nanoparticles and the precipitation of silica.

In addition, it is known that basic sodium silicate solution with pH 11-12 comprise a large number of polysilicate anions ($Si_4O_8(OH)_4$). Two opposite processes occur when such solutions are diluted and acidified, as in the case of this invention. De-condensation occurs upon dilution giving monomeric species $[Si(OH)_{4-x}]^{x-}$, whereas protonation favors oxolation reactions between Si—OH silanol groups leading to the formation of oligomers and the precipitation of $SiO_2$. Two main species are observed in diluted solutions around pH7, namely, $[SiO(OH)_3]^-$ and $Si(OH)_4$, silicic acid being the predominant. The condensation is supposed to proceed via the reaction of singly ionized species with silicic or polysilicic acid, Scheme 1.

Scheme 1: Condensation of ionized species with silicic acid to form Siloxane Bond

Example 2

Polyvinyl Pyrrolidone (PVP) Properties

Polyvinyl pyrrolidone (PVP) is a water soluble nonionic polymer; it has both hydrophilic and hydrophobic characters. It provides a remarkable combination of properties that no other molecule is yet able to have. PVP polymer is high polarity/proton acceptor, compatible with a variety of resins and electrolytes, soluble in water and polar solvents, hard, glossy, transparent, oxygen permeable films which adhere to a variety of substrates, adhesive and cohesive properties and cross linkable. PVP exhibits the ability to interact with variety of surfaces by hydrogen or electrostatic bonding, resulting in protective coatings and adhesive applications.

PVP polymers are available in several viscosity grades, ranging from low to high molecular weights. The PVP K-30 (Mw of 40,000) type was used. The pH of 5% aqueous solution is about 5, specific gravity at 25° C. is 1.062 $g/cm^3$, film density is 1.207 $g/cm^3$, specific heat is 0.803 Cal/g/KC and nitrogen content is 11.5-12.8%. The interaction of PVP with water has been extensively studied. Table 2 shows that pH, density and viscosity of PVP solutions are affected by changing of PVP polymer concentrations.

TABLE 2 pH, density and viscosity of PVP solutions

| PVP (Wt. %) | pH | Viscosity (cP) | Density (g/cm³) |
|---|---|---|---|
| 1 | 5.83 | 1.48 | 0.9876 |
| 2 | 5.59 | 1.77 | 0.9896 |
| 3 | 5.20 | 2.16 | 0.9936 |
| 4 | 4.90 | 2.53 | 0.9966 |
| 5 | 4.49 | 3.00 | 1.0062 |

Generally, it is believed that, polar carbonyl groups of PVP are responsible for interaction with other polar compounds through hydrogen bonding. Water molecule form hydrogen bond to the polar, negatively charged pyrrolidone carbonyl oxygen because pyrrolidone, a five-membered planar lactam, affords maximum π, π orbital overlap. The canonical resonance forms highlight the potential for a partial negative charge to form on oxygen as shown in Scheme 2. The partial charge on nitrogen is sterically shielded by the polymer backbone and the surrounding pyrrolidonemethylenes. Because of high dipole moment and polarity, PVP has a noticeable effect on water structure.

Scheme 2: Resonance structure of pyrene ring within PVP

Example 3

Reaction of Sodium Silicate with Polyvinyl Pyrrolidone

Nano-sized dispersed colloidal suspension is formed when PVP solution is added to sodium silicate solution. The interacting site of PVP segment in solution is the negatively charged carbonyl group in the resonance structure of the pyrene ring of PVP segment shown in Schemes 2 and 3. Hydrogen bonding is assumed to be the predominant mechanism for the adsorption of PVP on sodium silicate surfaces. This may be due to the acid-base mechanism between the rich hydroxyl groups available on the silicate surfaces and PVP polymers carbonyl groups which are capable of forming hydrogen bonds at the interface.

Hydrogen bonding plays significant role in the treatment process. Particularly, it is strong type of polar interaction, which occurs in molecules where hydrogen atoms are attached to highly electronegative oxygen atoms. In such case, the hydrogen's sole electron is drawn toward the electronegative atom leaving the strongly charged hydrogen nucleus exposed. Hence, the exposed positive nucleus exerts considerable attraction on electrons in other molecules forming a protonic bridge, which is substantially stronger than most other types of dipole interactions.

In addition, since the chain length of PVP is a key parameter it is advocated that pyrrolidone might serve as substrates for silica formation. Furthermore, silicic acid monomers, which brought close enough by interaction with PVP, shall favor oligomerization. Gelation then proceeds by further condensation of monomers with these pre-condensed species (Scheme 3).

Scheme 3: Electrostatic interaction between sodium silicate solution and PVP polymer solution

Example 4
Gel Formulation

Gelatinous silicate product is obtained as a result of the interaction between nano-sized dispersed colloidal system of sodium silicate and PVP (mixture A), and calcium chloride dihydrate (compound C).

In another application the desired concentration of calcium chloride solution (compound C) shall be added to PVP (compound B) to form a new material, designated as mixture C. Then mixture C is added to sodium silicate solution (compound A) to instantly form liquid binder (mixture B) which is function of system temperature.

In both applications, PVP acts as acidic reactant agent and calcium chloride acts as a gelation time controlling agent or as an accelerator. Calcium chloride controls gelation time and imparts permanence to the gel. These reagents produce very low penetrability gels, which are suitable for permeation treatments of soil mass.

Silicates react with soluble calcium chloride to produce insoluble calcium silicates or calcium silicate gels. Excessive amounts of calcium chloride may result in undesirable flocculation or formation of local gelation, producing variations in both the gel and setting times resulting in poorly grouted area.

Control of gelation time is important in regard to in-situ application. It is a function of the binder components, ratios and environmental conditions. Gelation time is defined as the interval between initial mixing of the binder components and formation of the gel.

When mixture B is injected and/or mixed with sand dunes and hardens the mechanical properties of the solidified material increased suggesting a possible reaction between various components. As indicated previously, the main reaction involved during the material solidification is electrostatic interactions between negatively charged ions on the PVP chain and positively charged silica species, which are promoted with decreasing particle size. Practically, PVP reacts with silicate solution to form colloidal solution which polymerizes further with calcium chloride addition to form a gel that binds sand dunes particles together and fills voids. The gel forms an adhesive bond with the surrounding sand dunes. Scheme 4 shows the distribution of negatively charged ions along the PVP chain which could bring silica oligomers close enough for condensation to occur.

When the resultant binding material mixed with sand dunes a strong gel is formed. The highest degrees of interaction are formed by electrostatic interactions followed by hydrogen bonding. It is one of the aims of this invention is to form convenient compounds by means of hydrogen bonding between silicate as Lewis-acid and PVP as Lewis-base functional groups. In polymer reactions, a physical bond (hydrogen bond) is formed. In this invention, the process involved in solidifying sand dunes is the formation of insoluble PVP modified calcium silicate nano-sized particles (mixture B) which interact with sand dunes via electrostatic interactions. Finally, the binder will form lubricant around solid surface, fill the voids, inhibit volume changes, and contribute to overall strength development of the solidified soil mass.

Scheme 4: The distribution of negatively charged along the PVP chain could bring silica oligomers close enough for condensation to occur

Example 5

Optimization of the Gelation Process

To optimize the gelation process, three sets of experiments were conducted. In the first set, sodium silicate solution (compound A) was diluted with distilled water to different concentrations from 100 to 10% by volume at fixed concentrations of PVP (compound B) and calcium chloride (compound C). In the second set, PVP (compound B) was added at different concentrations from 1 to 5% at fixed concentrations of calcium chloride (compound C) and sodium silicate (compound A). In the third set, calcium chloride (compound C) was added at different concentrations from 0.3 to 2% at fixed concentrations of PVP (compound B) and sodium silicate (compound A). Generally, sodium silicate concentration used in soil grouting is in the range of 10 to 70% by volume, depending on the material being grouted and the desired result to be achieved. For other systems, which utilized polymeric materials as grouting agents, polymer concentration varies from 2 to 10%. Since temperature has a major effect on reaction processes, pH, gelation time, and strength development, prepared mixtures were tested at 25, 40 and 60° C.

Gelation times were determined by adding dilute solutions of the gel-forming reagent to sodium silicate solution, mixing well, and allowing the mixture to stand in a 4-oz. bottle kept in a 25, 40 and 60° C. until a gel is formed. The gelation criteria adopted in this investigation are the loss of uniform fluid flow, the appearance of breakage planes when the mixture is tilted, and the adherence of solid gel to the glass wall.

a—pH Gel System Dependency

In the chemical reactions, pH is always used as an important response at constant mixing time and temperature. As a result of negative charges of silica particles at high pH values; there are strong electrostatic repulsion forces between silica particles. These forces are high enough such that silicate solutions do not gel at pH greater than 11. To induce gelation, electrostatic forces should be reduced which could be realized via two approaches. The first is to decrease pH while, the second is to reduce the dielectric constant of the aqueous medium by adding salts. The strength of ionic interactions is therefore inversely proportional to the distance between the charges and the dielectric constant of the solvent, which varies from 2 in non-polar solvents like hexane to 80 in highly polar solvents such as water. Ionic interactions are weakened as the ionic strength of the solvent increases and the charge is shielded by counter ions. Ionic interactions are affected by the pH of the solution since pH determines the number of charged residues.

The alteration of pH of the mixture was determined using a Beckman pH meter within 2 minutes after mixing. In this invention, PVP and $CaCl_2$ solutions reacted with sodium silicate solutions and the mixture was set for gelation at 25° C. Assuming that the gelation is due to a condensation reaction of this type, fast gelling should occur near the pH of least ionization, where there is a minimum of repulsion forces between similarly charged silicic acids or hydroxides, or an equal number of positively and negatively charged species containing silicon hydroxides.

The experimental condition summarized in Table 3 indicates that; the pH of the prepared mixtures after 2 minutes was between 10.3 and 11.08. It is also shown that the pH is decreased gradually when the ratio of PVP to sodium silicate is increased and the ratio of calcium chloride to sodium silicate is increased.

TABLE 3 pH variations as function of blend concentrations at constant temperature

| Blend | | | pH/ 25° C. | | |
|---|---|---|---|---|---|
| Sodium Silicate vol. % | Water vol. % | $CaCl_2$ wt % | 1 wt % | PVP 3 wt % | 5 wt % |
| 13.00 | 87.00 | 0.50 | 10.70 | 10.72 | 10.64 |
| 33.33 | 66.67 | 0.50 | 10.97 | 10.91 | 10.86 |
| 66.67 | 33.33 | 0.50 | 11.08 | 11.02 | 10.93 |
| 13.00 | 87.00 | 1.00 | 10.61 | 10.55 | 10.52 |
| 33.33 | 66.67 | 1.00 | 10.91 | 10.78 | 10.70 |
| 66.67 | 33.33 | 1.00 | 10.99 | 10.91 | 10.82 |
| 13.00 | 87.00 | 1.33 | 10.35 | 10.36 | 10.30 |
| 33.33 | 66.67 | 1.33 | 10.74 | 10.73 | 10.65 |
| 66.67 | 33.33 | 1.33 | 10.92 | 10.82 | 10.72 | b—Gelation Time System Dependency

Variation of the reactant ratios has evidently an influence on the characteristics of the desired gels. The characteristics recognized as being the most important ones are pH, and gelling time. The time required for the mixture of PVP, $CaCl_2$ and sodium silicate solutions to become gelled was investigated. The optimum gelling time is between 15 and 60 minutes. It has been also established that the gel characteristics have their optimum values when ratios of reagent weight (PVP and calcium chloride) and silicate volume is maintained between 0.04 and 0.12, and viscosities between 2 to 6 centipoises, which is controlled during experiment design.

Table 4 points out that gelation time is reduced when PVP and calcium chloride concentrations are increased and when sodium silicate is decreased as well. Calcium chloride reacts with sodium silicate to form calcium silicate, which has very low solubility in water. The gelation time is significantly decreased with the addition of calcium chloride (0.5 to 1.5%), especially at the low sodium silicate concentrations (13 vol. %). With the addition of more than 2% of calcium chloride to the silicate mixture, an immediate precipitation was observed and the gelling status vanished. Therefore, addition of $Ca^{+2}$ ions has a catalyst effect on gelation of the silicate. Table 4 demonstrates that gelation time was dropped with increase of both of PVP and calcium chloride.

TABLE 4

Variations of gelation time with blend composition and concentration at constant temperature of 25° C.

| Blend | | | Gelation time (min)/25° C. | | |
|---|---|---|---|---|---|
| Sodium Silicate vol. % | Water vol. % | $CaCl_2$ wt % | 1 wt % | PVP 3 wt % | 5 wt % |
| 13.00 | 87.00 | 0.50 | 540 | 180 | 60 |
| 33.33 | 66.67 | 0.50 | 600 | 420 | 210 |
| 66.67 | 33.33 | 0.50 | 3600 | 2880 | 2400 |
| 13.00 | 87.00 | 1.00 | 100 | 90 | 40 |
| 33.33 | 66.67 | 1.00 | 140 | 120 | 60 |
| 66.67 | 33.33 | 1.00 | 1320 | 900 | 600 |
| 13.00 | 87.00 | 1.33 | 50 | 40 | 38 |
| 33.33 | 66.67 | 1.33 | 90 | 78 | 51 |
| 66.67 | 33.33 | 1.33 | 980 | 600 | 100 | c—Temperature Gel System Dependency

To estimate temperature effect on gelation time of sodium silicate, PVP and calcium chloride, gelation time was measured at different mixing temperatures of 25° C., 40° C. and 60° C. The results shown in Tables 5 and 6 revealed that, the interaction effect and consequently gelation process are accelerated with temperature increases. Heat development contributes to temperature rise of the silicate mixture to a level necessary for the accelerator (CaCl$_2$) to react with PVP and sodium silicate thus, enhancing the gelation process. At room temperature (25° C.), a significant increase in gelation time was detected. However, when mixing temperatures were elevated from 25 to 40 and 60° C., substantial decrease in gelling times is observed. The effect of sodium silicate, PVP and CaCl$_2$ concentrations on gelation time has similar trends for all tested temperatures of 25, 40 and 60° C. A further temperature increase might benefit both mixing and gelation reaction through decreasing viscosity, increasing diffusion, and enhancing reaction between participating reactants. Therefore, it is safe to state that temperature utilization has an added extra advantage to the developed system in this invention.

TABLE 5

Variations of gelation time with blend composition and concentration at constant temperature of 40° C.

| Blend | | | Gelation time (min)/40° C. | | |
| --- | --- | --- | --- | --- | --- |
| Sodium Silicate vol. % | Water vol. % | CaCl$_2$ wt % | PVP 1 wt % | 3 wt % | 5 wt % |
| 13.00 | 87.00 | 0.50 | 55 | 30 | 20 |
| 33.33 | 66.67 | 0.50 | 95 | 53 | 32 |
| 66.67 | 33.33 | 0.50 | 120 | 60 | 55 |
| 13.00 | 87.00 | 1.00 | 29 | 17 | 16 |
| 33.33 | 66.67 | 1.00 | 60 | 35 | 29 |
| 66.67 | 33.33 | 1.00 | 80 | 60 | 51 |
| 13.00 | 87.00 | 1.33 | 19 | 16 | 14 |
| 33.33 | 66.67 | 1.33 | 22 | 25 | 22 |
| 66.67 | 33.33 | 1.33 | 45 | 40 | 26 |

TABLE 6

Variations of gelation time with blend composition and concentration at constant temperature of 60° C.

| Blend | | | Gelation time (min)/60° C. | | |
| --- | --- | --- | --- | --- | --- |
| Sodium Silicate vol. % | Water vol. % | CaCl$_2$ wt % | PVP 1 wt % | 3 wt % | 5 wt % |
| 13.00 | 87.00 | 0.50 | 19 | 17 | 15 |
| 33.33 | 66.67 | 0.50 | 22 | 21 | 16 |
| 66.67 | 33.33 | 0.50 | 40 | 33 | 20 |
| 13.00 | 87.00 | 1.00 | 17 | 15 | 13 |
| 33.33 | 66.67 | 1.00 | 16 | 17 | 15 |
| 66.67 | 33.33 | 1.00 | 22 | 19 | 18 |
| 13.00 | 87.00 | 1.33 | 16 | 14 | 12 |
| 33.33 | 66.67 | 1.33 | 15 | 16 | 13 |
| 66.67 | 33.33 | 1.33 | 18 | 17 | 14 |

Example 6

Solidification of Sand Dunes a—Analysis of Sand Dunes

The properties of sand dunes to be solidified or treated were determined following the procedures described by ASTM standards. Sand dunes were collected from Al-Jimi area of Al Ain district of the United Arab Emirates. Particle size distribution is characterized by grain size ranging from 0.1 to 1 mm and soil composition of 35% gravel, 43% sand, 18% silt, and 4% clay; it is described as siltysand. Soil indexes such as uniformity coefficient of 14.11 indicating large range in grain sizes, and curvature coefficient of 0.88 representing well-graded soil, were determined Maximum dry density of 1.79 Mg/m$^3$ and optimum moisture content of 12% by dry weight were calculated from compaction tests. To determine other relevant soil properties, specimens were compacted at maximum dry density and optimum moisture content. Hydraulic conductivity, which is a measure of the ease by which water can seep through the soil, is 3.0E-05 m/sec indicating the high permeable nature of this soil. In addition, strength properties of the soil revealed that the shear strength of soaked specimens decreased by about 2.5 times from those of un-soaked ones due to destruction of brittle bonds between particles, and salt dissolution upon wetting.

Mineralogical composition reveals that the major constituents are silica, calcite and plagioclase, and the minor constituents are dolomite, feldspar and kaolinite. Analysis of soil water extract indicates that soil is alkaline with pH 8.1 and electrical conductivity of 1.18E-03 S. These measured values were confirmed by types and amounts of soluble ions in solution (Na, K, Mg, Ca, CaCO$_3$, HCO$_3$ and Cl with measured concentrations of 140, 8.5, 34, 48, 520, 140 and 460 ppm, respectively).

b—Treatment of Sand Dunes

Sand dunes can be first treated with aqueous sodium silicate solution (compound A), followed by addition of PVP (compound B) and then calcium chloride solution (compound C), or, if desired, the PVP and calcium chloride (mixture C) can be applied first followed by the application of sodium silicate solution (compound A). Alternatively, aqueous silicate solution (compound A) and PVP (compound B) are mixed together to form mixture A; then salt solution (compound C) is added to mixture A to form mixture B, which in turn is added to the soil (FIG. 1). It is preferred that mixture B is added to the soil within a period of about 1 to 5 minutes because it will start to gel within 15 to 60 minutes.

Gel-granular mixture was prepared taking into account the fluidity and the homogeneity of the mixture. In the presence of high amount of gel solution, treated samples display flocculation and heterogeneity. In the same way, in presence of low amount of gel solution, the binder will not be able to cover grain surfaces completely and treatment technique might not be practicable. The preferred amount of such mixtures, to be used, is between 10 to 60% calculated by the weight of the dry soil. On the other hand, in other applications, the preferred amount is between 15 to 25%. However, in this example, an optimum gel mixture ratio of 20% was used. The treated sand dunes were compacted in cube mold (50×50×50 mm) by a load of 10 N, and then specimens were placed in an oven at 40° C. for 3-7 days for curing.

c—Strength of Solidified Sand Dunes

The optimum gel mixture used for treatment of sand dunes varies depending on the desired strength in short- and long-term perspectives, for both dry and wet conditions. Strength and good durability are also important factors in cases of varying soil conditions. An unconfined compressive test was conducted to study the improvement in the mechanical properties of sand dunes treated with binder consisting of mixture B. Tests were conducted using an MTS® machine equipped with universal testing software (Test Works®) capable of numerical and graphical analysis of the test data. All tests were conducted at constant cross head speed of 5×10$^{-6}$ m/s.

The influence of mixture B composition (i.e., sodium silicate, PVP and CaCl$_2$ contents) on strength developments is described in terms of general strength levels with intention to determine the optimum mixture composition for all tested cases. Table 7 shows the effects of different admixtures used in solidifying sand dunes. There are clear variations in strength with respect to different gelling mixture compositions and sand dunes.

TABLE 7

Variations in strength with respect to different gelling mixture compositions and sand dunes

| Blend | | | Compressive strength MPa/40° C. | | |
|---|---|---|---|---|---|
| Sodium Silicate vol. % | Water vol. % | CaCl$_2$ wt % | 1 wt % | PVP 3 wt % | 5 wt % |
| 13.00 | 87.00 | 0.50 | 2.58 | 3.46 | 3.87 |
| 33.33 | 66.67 | 0.50 | 3.40 | 4.04 | 5.15 |
| 66.67 | 33.33 | 0.50 | 5.04 | 5.97 | 9.69 |
| 13.00 | 87.00 | 1.00 | 2.40 | 3.59 | 3.68 |
| 33.33 | 66.67 | 1.00 | 3.42 | 4.10 | 5.59 |
| 66.67 | 33.33 | 1.00 | 4.88 | 5.29 | 10.51 |
| 13.00 | 87.00 | 1.33 | 2.48 | 3.38 | 3.79 |
| 33.33 | 66.67 | 1.33 | 3.44 | 4.27 | 5.86 |
| 66.67 | 33.33 | 1.33 | 4.80 | 5.85 | 10/37 |

Example 7

Morphological and Structural Evaluation a—Morphological Evaluation

Figure 2:
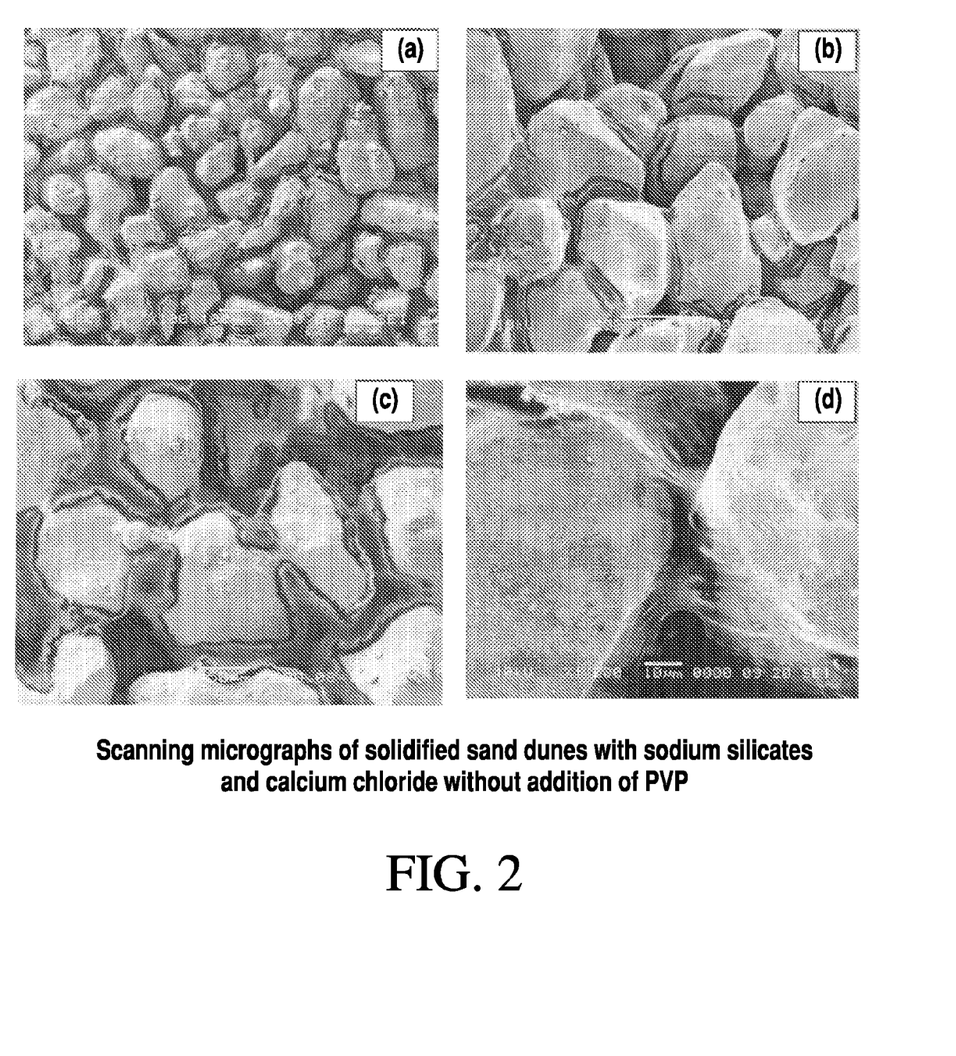
FIG. 2 shows scanning micrographs of solidified sand dunes with sodium silicates and calcium chloride without an addition of PVP.
Figure 3:
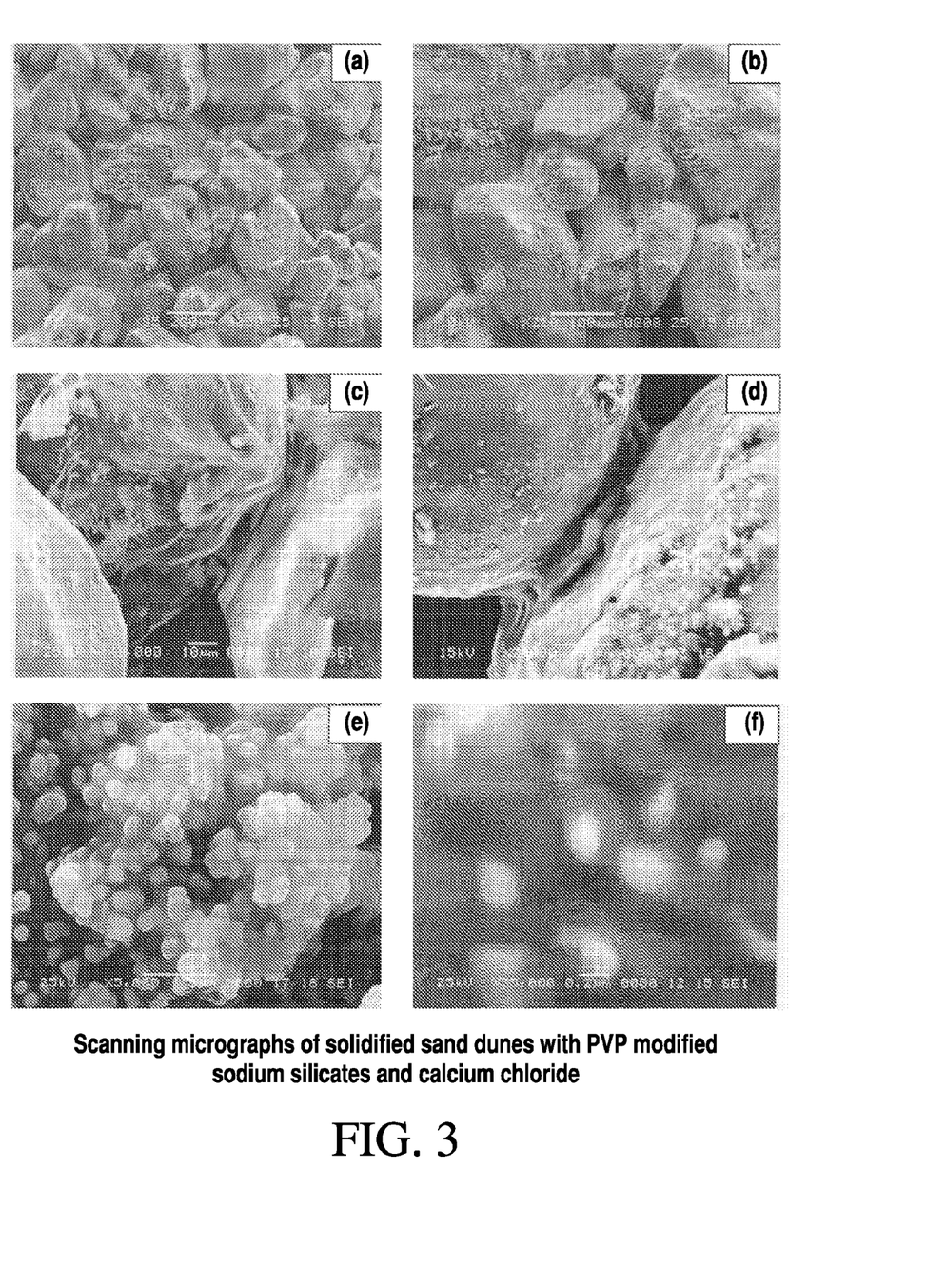
FIG. 3 shows scanning micrographs of solidified sand dunes with a PVP modified sodium silicates and calcium chloride; and, FIG. 4 is a graphical illustration of the fourier transform infrared spectroscopy (FTIR) of solidified sand dunes with (a) sodium silicates and calcium chloride without addition of PVP, and (b) with PVP modified sodium silicates and calcium chloride.

Microstructure observation of solidified sand dunes was examined using JSM-5600 JOEL microscope equipped with an energy dispersive x-ray detector for chemical analysis. Sample fragments were coated with 12 nm gold layer to improve SEM imaging. The SEM analysis conditions were: voltage is 15 kV; working distance is 20 mm; void pressure is ultimate pressure system control with fully automatic and the image mode is secondary electron. The focus of this examination is to evaluate the mechanisms involved in sand dunes solidification. In case of solidified sand with sodium silicate and calcium chloride dihydrate (without PVP), silicate ties sand particles which appeared as continuous films that bridge all over sand particles (FIG. 2). Such binding mechanism of sand surfaces is not preferred from practical and mechanical viewpoints due to presence of large distances between sand particles. Upon addition of PVP modified sodium silicate gelling mixture (mixture B), microstructure improved as shown in FIG. 3 where nano-particulate gels and small amount of gel resides, as inter-particle ties, covered sand particles. It is attributed to the reaction between PVP with sodium silicate to produce nano-sized colloidal structure followed by gelatin films. PVP also acts as a smoother for both sand and silicate particles.

In addition, formation of dense hybrid structure was observed with particle sizes ranging from micrometers to nanometers (200 nm) due to hydrogen bonding between amide group of PVP and surface hydroxyl groups of silicate. At higher magnification, a solidified particle size of less than 100 nm was observed.

PVP bulky side groups (carbonyl groups) also contribute to material development with high friction property, and reduction of voids volume of polymer and silicates, leading to mobility restriction of sand particles within the solidified matrix. The results also suggest that multi-molecular systems, rather than single components, are responsible for nano-structure formation and overall stable binding system.

b—Structure Elucidation

While the SEM images have shown that solidification of sand dunes has been established, it was necessary to confirm interaction mechanisms between sodium silicate, PVP and sand particles. FTIR spectra provide information about intermolecular interaction corresponding to stretching or bending vibrations of particular bonds. The IR spectrum was recorded by using Nicolet FT-IR (Model 6700) system. The IR spectra of solidified sand dunes were taken as powder samples mixed with a small amount of KBr powder to make the IR pellet.

Figure 4:
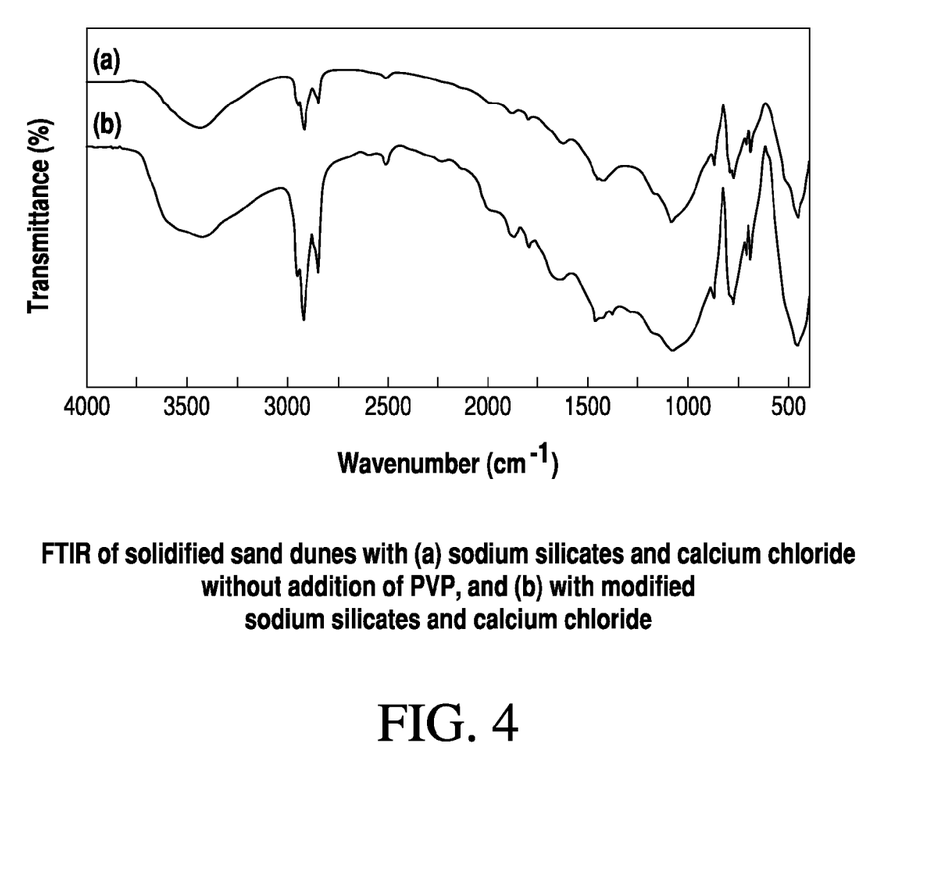

FIG. 4 shows FTIR spectrum of sand dunes solidified with PVP modified sodium silicate (FIG. 4b) and without PVP modification (FIG. 4a). FIG. 4a shows (a) OH vibration (vOH) of water molecules at 3400 cm$^{-1}$, (b) bending of water molecules ($\delta H_2O$) at 1640 cm$^{-1}$, (c) asymmetric stretching of Si—O—Si at 980-1200 cm$^{-1}$, and (d) deformation of Si—OH at 870 cm$^{-1}$. FIG. 4b shows additional bands for (a) C=O absorption peak from amide group of PVP at 1652 cm$^{-1}$, (b) C—N group at 1287 cm$^{-1}$, (c) C—H bending vibrations at 1420-1460 cm$^{-1}$. Hydrogen bonding between the amide carbonyl groups of PVP and surface hydroxyl groups of silicate causes a shift in peak position of O—H towards lower wave numbers with increased intensity and peak broadening. The shift in peak positions depends on the strength of the interactions.

Example 8

Durability Performance a—Hydraulic Conductivity

Hydraulic conductivity tests were performed for: (a) sand dunes, (b) sand dunes mixed with gelling mixture, and (c) dune sand sprayed with gelling mixture. The obtained hydraulic conductivity measurements were 3.0E-05, 1.32E-07, and 1.22E-07 m/s, respectively. These results revealed a significant reduction in hydraulic conductivity of the sand dunes solidified with gelling mixture (mixture B). Mixing of sand dunes with gelling mixture led to coverage of sand particles with gelling mixture and formation of inter-particle ties as seen from SEM pictures. This in turn contributed to the formation of dense structure with low hydraulic conductivity. On the other hand, sprayed specimens exhibited a slightly lower hydraulic conductivity in comparison with that treated by the mixing method which could be attributed to film formation on top surfaces of sprayed specimens.

b—Effect of Humidity

To evaluate the durability of treated samples, a wet-test procedure (soaking test) was developed. Treated specimens, with curing time of 7 days, were placed on its side in water with 12.5 mm height of water for a period of 30 minutes. Then, the specimen was removed from the water and left in air for 5 minutes. Afterwards the specimen was subjected to compressive strength test. Table 8 shows percent strength reduction of treated sand dunes, after partial soaking in water, in relation to sodium silicate and PVP concentrations. It was observed that, at fixed concentration of calcium chloride dihydrate of 1 wt. % and different PVP concentrations of 1, 3 and 5 wt. %, samples show slight decrease in strength when sodium silicate concentrations increased due to increase of mixture viscosity and binding strength between silicates and sand particles. In addition, increasing of PVP concentration induces inner ties between particles, thus, limiting particle movements and strength loss under wet condition. Therefore, to limit strength reduction, it is recommended to use high concentrations of sodium silicates and PVP.

TABLE 8

Strength reduction with various blend composition after partial soaking in water

| Blend | | | Strength reduction (%) | | |
|---|---|---|---|---|---|
| Sodium Silicate vol. % | Water vol. % | CaCl$_2$ wt % | 1 wt % | PVP 3 wt % | 5 wt % |
| 13.00 | 87.00 | 1 | 20.83 | 19.22 | 15.76 |
| 33.33 | 66.67 | 1 | 10.82 | 9.76 | 6.80 |
| 66.67 | 33.33 | 1 | 6.15 | 5.51 | 1.54 | c—Wind Erosion

A wind tunnel study was conducted to evaluate the effectiveness of gelling mixtures in reducing the erosion potential of the treated material. The study was conducted using Armfield Wind Tunnel for scientific investigation and experiments. Trays were filled with treated and untreated sand dunes specimens and subjected to free stream wind speeds of 3, 7 and 14 m/s for different time intervals. The trays were weighed again and the loss of loose (eroded) material was calculated. Prevailing winds from a constant direction are the most important climatic element for the formation of sand dunes. Winds of velocity greater than 5.3 m/s can transport sand dunes. Table 9 shows an increase of the cumulative soil loss for untreated sand dunes with increasing of wind velocity and time. For treated sand dunes, the loss was very small measuring about 0.8% after 30 minutes at wind velocity of 14 m/s. Such results would lead one to conclude that the nano-sized PVP modified sodium silicate binder, formulated in this invention, is beneficial for controlling sand dunes mobility in harsh wind environments.

TABLE 9

Percent by wt of loss (eroded) material at different velocities (m/s)
% by wt of loss (eroded) material at different velocities (m/s)

| Time (min) | Untreated Sand Dunes | | | Treated Sand Dunes | | |
| --- | --- | --- | --- | --- | --- | --- |
| | 3 | 7 | 14 | 3 | 7 | 14 |
| 5 | 28.35 | 49.23 | 55.44 | 0.1277 | 0.3799 | 0.3232 |
| 10 | 39.58 | 67.71 | 76.23 | 0.1277 | 0.4433 | 0.3878 |
| 15 | 58.28 | 70.90 | 85.31 | 0.1916 | 0.5066 | 0.5817 |
| 20 | 65.13 | 74.48 | 99.29 | 0.1916 | 0.5066 | 0.6464 |
| 25 | 70.34 | 76.72 | 100 | 0.1916 | 0.5066 | 0.7110 |
| 30 | 73.56 | 77.74 | 100 | 0.1916 | 0.5066 | 0.8403 |
| 35 | 74.93 | 78.77 | 100 | 0.1916 | 0.5066 | 0.8403 |
| 40 | 76.57 | 79.98 | 100 | 0.1917 | 0.5066 | 0.8403 |
| 45 | 76.64 | 81.07 | 100 | 0.1919 | 0.5066 | 0.8403 |
| 50 | 78.83 | 81.52 | 100 | 0.1919 | 0.5066 | 0.8403 |
| 55 | 79.04 | 81.64 | 100 | 0.1919 | 0.5066 | 0.8403 |
| 60 | 80.13 | 81.84 | 100 | 0.1919 | 0.5066 | 0.8403 |

REFERENCES

Allen L. H. and Matijevic E. (1969) Stability of colloidal silica. I. Effect of simple electrolytes. *J. Colloid Interface Sci.* 31, 287-296.

Icopini, G. A., Brantley, S. L., and Heaney, P. J. (2005) Kinetics of silica oligomerization and nanocolloid formation as a function of pH and ionic strength at 25° C. Geochimica et CosmochimicaActa, Vol. 69, No. 2, pp. 293-303.

Iler, R. K. (1979). Chemistry of Silica—Solubility, Polymerization, Colloid and Surface Properties and Biochemistry. John Wiley & Sons.

Perry C. C. and Keeling-Tucker T. (2000) Biosilicification: The role of the organic matrix in structure control. *J. Biol. Inorganic Chem.* 5 (5), 537-550.

While the invention has been disclosed in connection with its preferred embodiments it should be recognized that changes and modifications may be made therein without departing from the scope of the appended claims.

What is claimed is:

1. A nano-sized dispersed binder to immobilize sand dunes and wind-blown particles, said binder comprising: a polyvinyl pyrrolidone (PVP) modified sodium silicate and a calcium chloride dihydrate solution.

2. A nano-sized dispersed binder according to claim 1, in which a nano-sized dispersion structure referred to as mixture A is comprised of an aqueous sodium silicate solution designated as compound ("a") and a PVP designated as compound ("b") is formed into a binder referred to as mixture B and calcium chloride dihydrate solution referred to as compound "c" are mixed together.

3. A nano-sized dispersed binder according to claim 2, in which said binder comprises from 10 to 70 vol. % of water diluted compound "a", from about 1 to 5 wgt. % of compound "b", and from about 0.5 to 1.5 wgt. % of compound "c".

4. A nano-sized dispersed binder according to claim 2, in which compound "a" has $SiO_2$ to $Na_2O$ weight ratios of 3.22:1 and 40% solids.

5. A nano-sized dispersed binder according to claim 2, in which water diluted compound "a" concentration ranges from 10 to 70 vol. % and exhibit desirable physico-chemical characteristics for pH from about 11.79 to 11.96, viscosity from about 1.33 to 9.48 centipoise, and density from about 1.089 to 1.265 $g/cm^3$.

6. A nano-sized dispersed binder according to claim 2, in which compound "b" has molecular weight of 40,000, film density of 1.207 $g/cm^3$ and nitrogen content ranging from 11.5 to 12.8%.

7. A nano-sized dispersed binder according to claim 2, in which compound "b" concentration ranges from 1 to 5 wgt. % and exhibits a physico-chemical characteristics for pH from about 5.83 to 4.49, viscosity from about 1.48 to 3 centipoise, and density from about 0.988 to 1.006 $g/cm^3$.

8. A nano-sized dispersed binder according to claim 2, in which compound "c" exhibits a concentration ranging from about 0.5 to 1.33 wgt. %.

9. A nano-sized dispersed binder according to claim 2, in which mixture B possesses a pH value from about 10 to 11.

10. A nano-sized dispersed binder according to claim 2, in which mixture B temperature ranges from 25 to 60° C. and about 40° C.

11. A nano-sized dispersed binder according to claim 10, in which the desired concentrations for compound "a" ranges between 13-66.67 vol. %, compound "b" ranges between 1 to 5 wgt. %, and compound "c" ranges between 0.5 to 1.33 wgt. %.

12. A nano-sized dispersed binder according to claim 11, in which the desired gelation time ranges from 17 to 60 minutes.

13. A nano-sized dispersed binder according to claim 11, in which optimum gelling characteristics can be achieved when the ratio of reagent weight (compound "b" plus compound "c") over compound "a" volume is maintained between 0.04 to 0.12, and viscosities between 2 to 6 centipoise.

14. A nano-sized dispersed binder according to claim 11, in which a weight of mixture B aqueous solution is about 15 to 25% of dry weight of sand dunes.

15. A nano-sized dispersed binder according to claim 1, in which upon curing the solidified material (mixture B plus sand dunes) exhibits a desirable compressive strength ranging between 3.59 to 5.29 MPa.

16. A nano-sized dispersed binder according to claim 1, in which upon curing the solidified material (mixture B plus sand dunes) endures a maximum material loss of 1 wgt. % when exposed to wind velocity of 14 m/s for 1 hour.

17. A nano-sized dispersed binder according to claim 1, in which upon curing the solidified material (mixture B plus sand dunes) maintains a hydraulic conductivity in the order of $1.0 \times 10^{-7}$ m/s.

* * * * *